US012726837B2

(12) United States Patent
Graham

(10) Patent No.: US 12,726,837 B2
(45) Date of Patent: Sep. 1, 2026

(54) CELLULAR NETWORK DIAGNOSTICS USING ALARM SIGNAL ANALYSIS

(71) Applicant: Boost SubscriberCo L.L.C., Englewood, CO (US)

(72) Inventor: Joshua Bryan Graham, Brighton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 208 days.

(21) Appl. No.: 18/398,911

(22) Filed: Dec. 28, 2023

(65) Prior Publication Data

US 2025/0220467 A1 Jul. 3, 2025

(51) Int. Cl.

| | |
|---|---|
| ***H04W 24/08*** | (2009.01) |
| ***H04L 41/0631*** | (2022.01) |
| ***H04W 24/04*** | (2009.01) |
| ***H04W 24/10*** | (2009.01) |

(52) U.S. Cl.

CPC ......... *H04W 24/08* (2013.01); *H04L 41/0631* (2013.01); *H04W 24/04* (2013.01); *H04W 24/10* (2013.01)

(58) Field of Classification Search

CPC ..... H04W 24/08; H04W 24/04; H04W 24/10; H04L 41/0631

See application file for complete search history.

(56) References Cited

U.S. PATENT DOCUMENTS

| | | | | |
|---|---|---|---|---|
| 7,636,424 | B1 * | 12/2009 | Halikhedkar | H04Q 3/0075 379/15.01 |
| 11,677,612 | B2 * | 6/2023 | Safavi | H04L 41/0895 370/216 |
| 2006/0161816 | A1 * | 7/2006 | Gula | H04L 63/1425 714/39 |
| 2017/0155539 | A1 * | 6/2017 | Wessels | H04L 41/0609 |
| 2023/0011452 | A1 * | 1/2023 | Barber | G06F 16/24558 |
| 2024/0103510 | A1 * | 3/2024 | Timmaraju | G05B 23/0281 |

OTHER PUBLICATIONS

Telcordia Technologies, Telcordia NMA system Generic Transport Network Element Interface Support, SR-1665, Issue 7, May 2023, entire document (Year: 2003).*

* cited by examiner

*Primary Examiner* — Ian N Moore
(74) *Attorney, Agent, or Firm* — Kilpatrick Townsend & Stockton LLP

(57) ABSTRACT

Systems, methods, and non-transitory, machine-readable media may facilitate cellular network diagnostics. Alarm signals may be responsive to a performance degradation or failure of a cellular network component. At least one network component mapped to the alarm signal may be identified so that network components may be mapped to the alarm signals. Network configurations associated with each network component may be obtained and may specify other network components connected directly or indirectly to each network component. The network configurations may be hierarchically analyzed to determine commonalities of the other network components connected directly or indirectly to each network component. Alarm data may be grouped into groups of alarms based on the commonalities. Network components that correspond to a lowest common denominator for each group may be identified. Diagnostic results may be generated based on the lowest common denominator for each group and may be exposed via a diagnostic interface.

21 Claims, 5 Drawing Sheets

CELLULAR NETWORK DIAGNOSTICS USING ALARM SIGNAL ANALYSIS

TECHNICAL FIELD

This disclosure generally relates to wireless networks, and more particularly to systems and methods for cellular network diagnostics.

BACKGROUND

Cellular networks are complex, large scale, and involve many components often on the order of hundreds of thousands or more. When things go wrong with such systems, pinpointing sources of problems within the complex cellular network can be tremendously challenging. To efficiently troubleshoot problems, a detailed understanding of the network, of how call flows work, and of how routing protocols work is necessary but often insufficient to quickly identify problems, considering the complexities involved and especially when tens, hundreds or more alarms are going off at approximately the same time. The troubleshooting process can be time consuming, cumbersome, and expensive, particularly when crews need to be sent to sites to evaluate issues and resolve the problems and when resources can be wasted misdiagnosing or troubleshooting scenarios that do not make the most logical sense. Conventional means for troubleshooting cellular networks are lacking in their capabilities, efficiency, adaptability, flexibility, and reliability.

Thus, there is a need for systems and methods that address the foregoing problems. This and other needs are addressed by the present disclosure.

BRIEF SUMMARY

Certain embodiments according to the present disclosure relate generally to wireless networks, and more particularly to systems and methods for cellular network diagnostics.

In one aspect, a method is for cellular network diagnostics. The method may include one or a combination of the following. A set of alarm signals may be received. Each alarm signal of the set of alarm signals may be responsive to a performance degradation or failure of a component of a cellular network. A network diagnostic tool may be triggered to perform one or a combination of the following operations. Each alarm signal of the set of alarm signals may be analyzed. At least one network component of the cellular network mapped to the alarm signal may be identified so that a set of network components may be mapped to the set of alarm signals. Network configurations associated with each network component of the set of network components may be obtained. The network configurations may specify other network components connected directly or indirectly to each network component of the set or network components. The network configurations may be hierarchically analyzed to determine one or more commonalities of the other network components connected directly or indirectly to each network component of the set or network components. A set of alarm data corresponding to the set of alarm signals may be grouped into one or more groups of alarms based at least in part on the one or more commonalities of the other network components. One or more network components that correspond to a lowest common denominator for each group of the one or more groups of alarms may be identified. Diagnostic results may be generated based at least in part on the lowest common denominator for each group of the one or more groups of alarms. The diagnostic results may be caused to be exposed via a diagnostic interface.

In another aspect, a system may facilitate cellular network diagnostics. The system may include one or more processing devices and memory communicatively coupled with, and readable by, the one or more processing devices and having stored therein processor-readable instructions which, when executed by the one or more processing devices, cause the one or more processing devices to perform one or a combination of the following operations. A set of alarm signals may be received. Each alarm signal of the set of alarm signals may be responsive to a performance degradation or failure of a component of a cellular network. Each alarm signal of the set of alarm signals may be analyzed. At least one network component of the cellular network mapped to the alarm signal may be identified so that a set of network components may be mapped to the set of alarm signals. Network configurations associated with each network component of the set of network components may be obtained. The network configurations may specify other network components connected directly or indirectly to each network component of the set or network components. The network configurations may be hierarchically analyzed to determine one or more commonalities of the other network components connected directly or indirectly to each network component of the set or network components. A set of alarm data corresponding to the set of alarm signals may be grouped into one or more groups of alarms based at least in part on the one or more commonalities of the other network components. One or more network components that correspond to a lowest common denominator for each group of the one or more groups of alarms may be identified. Diagnostic results may be generated based at least in part on the lowest common denominator for each group of the one or more groups of alarms. The diagnostic results may be caused to be exposed via a diagnostic interface.

In yet another aspect, one or more non-transitory, machine-readable media may have machine-readable instructions thereon which, when executed by one or more processing devices, cause the one or more processing devices to perform one or a combination of the following operations. A set of alarm signals may be received. Each alarm signal of the set of alarm signals may be responsive to a performance degradation or failure of a component of a cellular network. Each alarm signal of the set of alarm signals may be analyzed. At least one network component of the cellular network mapped to the alarm signal may be identified so that a set of network components may be mapped to the set of alarm signals. Network configurations associated with each network component of the set of network components may be obtained. The network configurations may specify other network components connected directly or indirectly to each network component of the set or network components. The network configurations may be hierarchically analyzed to determine one or more commonalities of the other network components connected directly or indirectly to each network component of the set or network components. A set of alarm data corresponding to the set of alarm signals may be grouped into one or more groups of alarms based at least in part on the one or more commonalities of the other network components. One or more network components that correspond to a lowest common denominator for each group of the one or more groups of alarms may be identified. Diagnostic results may be generated based at least in part on the lowest common denominator for each group of the one or more groups of alarms. The diagnostic results may be caused to be exposed via a diagnostic interface.

In various embodiments, the diagnostics results may include the one or more groups of alarms grouped based at least in part on the one or more commonalities, and one or more graphical representations of the one or more groups of alarms may be exposed via the diagnostic interface. In various embodiments, a set of one or more most likely issues causing each group of the one or more groups of alarms may be determined based at least in part on the one or more network components that correspond to the lowest common denominator for each group of the one or more groups of alarms. The diagnostics results may include the set of one or more most likely issues, and one or more graphical representations of the set of one or more most likely issues are exposed via the diagnostic interface.

In various embodiments, a set of one or more most likely issues causing each group of the one or more groups of alarms may be determined based at least in part on one or more resolution requests corresponding to one or more previous alarms. The diagnostics results may include the set of one or more most likely issues, and one or more graphical representations of the set of one or more most likely issues are exposed via the diagnostic interface. In various embodiments, the determining the set of one or more most likely issues causing each group of the one or more groups of alarms may be a function of recency of the one or more previous alarms. In various embodiments, resolution requests may be tracked. The one or more resolution requests corresponding to the one or more previous alarms may be based at least in part on the tracked resolution requests. In various embodiments, a set of one or more most likely issues causing each group of the one or more groups of alarms may be ranked based at least in part on remedial actions. The diagnostics results may include the remedial actions, and one or more graphical representations of the remedial actions ordered according to the ranking may be exposed via the diagnostic interface.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Disclosed embodiments according to the present disclosure may solve the above-mentioned problems. Various embodiments will now be discussed in greater detail with reference to the accompanying figures, beginning with FIG. 1.

Figure 1:
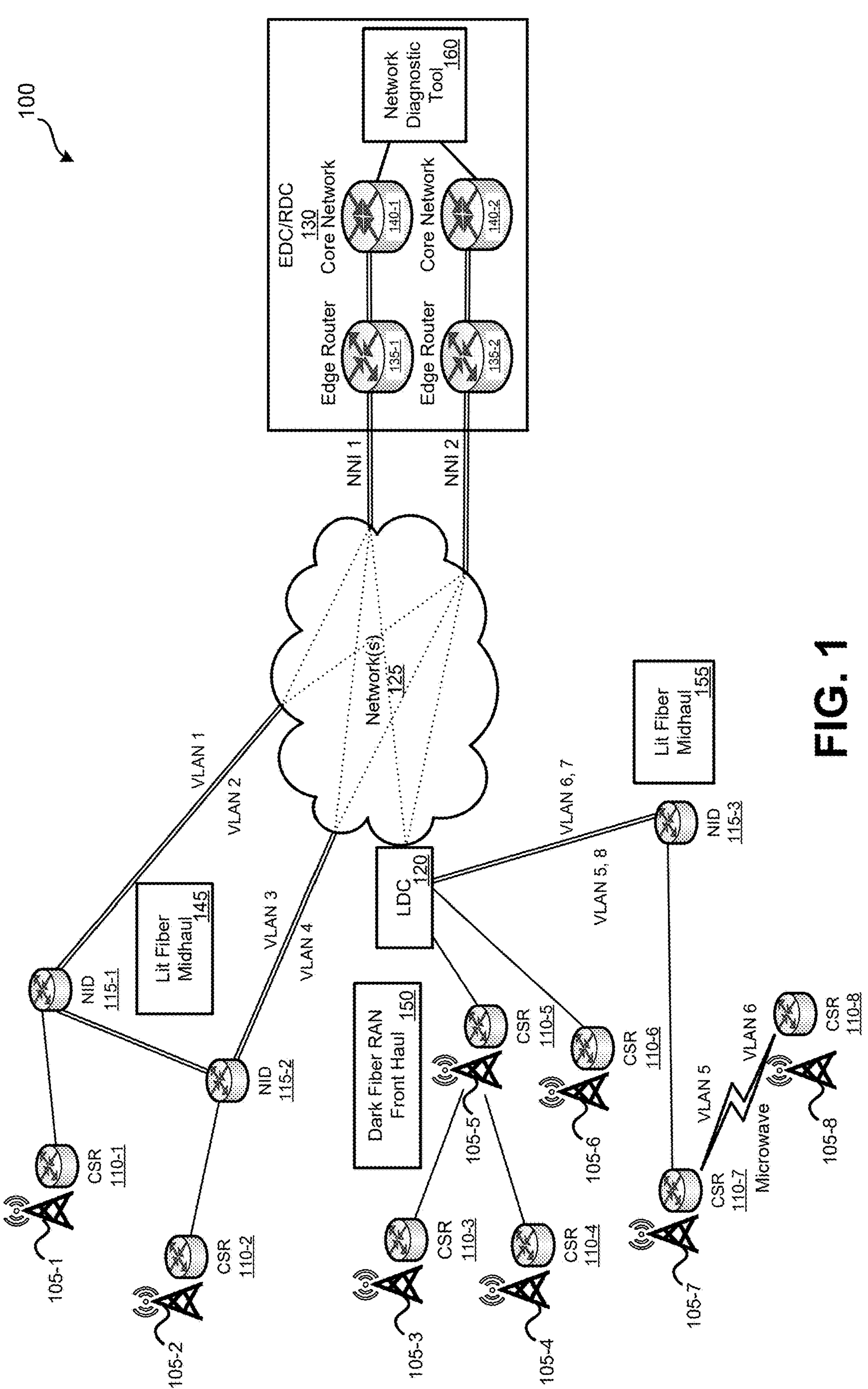
FIG. 1 illustrates a cellular network system, in accordance with disclosed embodiments according to the present disclosure.

FIG. 1 illustrates an embodiment of an architecture for a cellular network system 100 ("system 100"). Various embodiments according to the present disclosure may include one or a combination of the components of FIG. 1 and may correspond to different variations of thereof. The system 100 may include: cell sites 105 (cell site 105-1, cell site 105-2, cell site 105-3, cell site 105-4, cell site 105-5, cell site 105-6, cell site 105-7, cell site 105-8) communicatively coupled to cell site routers (CSRs) 110 (cell site router (CSR) 110-1, CSR 110-2, CSR 110-3, CSR 110-4, CSR 110-5, CSR 110-6, CSR 110-7, CSR 110-8); network interface devices (NIDs) 115 (network interface device (NID) 115-1, NID 115-2, NID 115-3); local data center (LDC) 120; network 125; edge data center (EDC) and regional data center (RDC) 130; edge routers 135 (edge router 135-1, edge router 135-2); cloud-based cellular network components corresponding to network core 140 (network core 140-1, network core 140-2); network diagnostic tool 160, and/or the like.

The CSRs 110 may communicatively couple the cell sites 105 to other cell sites 105, NIDs 115, and/or the LDC 120. The NIDs 115 may be communicatively coupled to the LDC 120 and/or the network 125 with VLANs 1, 2, 3, 4, 5, 6, 7, 8. Each NID 115 may provide a connection between a CSR 110 and a VLAN, routing traffic between the CSR 110 and the VLAN. Each site may have its own set of one or more VLANs. A lit fiber midhaul 145 may include, for example, NIDs 115-1, 115-2, VLANs 1, 2, 3, 4, and corresponding connections, among other components of the system 100. A lit fiber midhaul 155 may include, for example, NID 115-3, VLANs 5, 6, 7, 8, and corresponding connections, among other components of the system 100. A dark fiber open radio access network (RAN) front haul 150 may include, for example, cell sites 105-3, 105-4, 105-5, CSRs 110-3, 110-4, 110-5, and the corresponding connections, among other components of the system 100. The cell sites 105, LDC 120, other components of the lit fiber midhauls 145, 155 and front haul 150, and/or the like may be connected, via network-to-network interface (NNI) 1, 2 connections, to the cloud-based cellular network components corresponding to network core 140 via dark fiber transport and/or lit fiber transport provided by network 125. Accordingly, the network 125 may include a fiberoptic network, which may include multiprotocol label switching technology.

System 100 may correspond to a 5G New Radio (NR) cellular network; other types of cellular networks, such as 6G, 7G, etc. may also be possible. In various embodiments, the cloud-based cellular network components may be executed with the overlay network infrastructure on a third-party cloud-based computing platform or a cloud-based computing platform operated by the same entity that operates the RAN. The cloud-based cellular network components may be executed as specialized software executed by underlying general-purpose computer servers. A cloud-based computing platform may have the ability to devote additional hardware resources to cloud-based cellular network components or implement additional instances of such components when requested. The overlay network infrastructure may be a virtual infrastructure and may include a specialized 5G core built and operated in the cloud with virtual machines to provide 5G services using the compute resources of the underlay cloud infrastructure. The overlay network infrastructure may include a routing architecture may be specially configured to overlay into that cloud environment and may provide for functions that require routing and that are not natively available with the cloud environment—e.g., border gateway protocol configurations, routing content objects with network functions that are virtual machines ultimately up in the cloud, and/or the like.

The cloud-based cellular network components may include one or a combination of the edge routers 135, one or more EDCs and/or one or more RDCs 130. Such data centers may correspond to virtualized instantiations. Each RDC may serve primarily to route data among different data centers. A RDC may be in communication with multiple edge data centers. If data is to be routed among EDCs in direct communication with a RDC, components higher in the hierarchy of the cellular core network may not need to be involved in the routing of data. However, if data is being routed to an EDC not in direct communication with a RDC, a component higher in the hierarchy of the cellular core network may need to be used to complete the routing. Such a hierarchy may allow for data anywhere within the cellular network to be routed to other devices. EDCs and RDCs may collectively be referred to as nodes of the core cellular network. As illustrated, the system 100 may be configured with redundant services such that two (as in the illustrated example) or more different platforms may be implemented.

FIG. 1 illustrates some examples for logical connectivity of various components of the system 100. While FIG. 1 illustrates various components of the system 100, other embodiments of the system 100 may vary the arrangement, communication paths, and specific components of the system 100. In the example of system 100, only a small number of components are illustrated. In reality, the system 100 may include a much larger number of components. For example, the system 100 may include hundreds or thousands of cell sites 105 and corresponding components and connections. Greater numbers of NIDs 115, LDCs 120, EDCs/RCDs 130, and the like may be present. The system 100 may include greater numbers of levels within the hierarchy within the core cellular network and may include, for example, a national data center in some embodiments. Groups of EDCs 130 may have a dedicated bandwidth to communicate with cloud-based cellular network components. Therefore, it should be understood that the number and types of radio access network components that communicate with an EDC 130 may vary. Further, the components of the cellular core network that the EDC 130 communicates with may also vary.

There may be different aggregation points in the system 100. For example, a CSR 110 at a cell site 105 may be an aggregation point. The LDCs 120 may be the first aggregation points for the geographically distributed cell sites on dark fiber. An EDC 130 in a market may aggregate the lit fiber cell sites and all the market LDCs' traffic as well. An EDC 130 may also aggregate nearby dark fiber dell sites as well for a collocated LDC 120. An RDC 130 may serve as an aggregation point for multiple markets (EDC traffic). In a market, there may be one or more collocated RCD/EDCs 130, and/or LDCs 120. An NNI, being an interface that specifies signaling and management functions between the network 125 and the EDC/RDC 130, may, for example, aggregate up to 500 sites or more to one pipe to the EDC/RDC 130, in order to connect the pipeline to the cloud-based cellular network components.

The network diagnostic tool 160 may be communicatively coupled to the core network 130. Components such as the network diagnostic tool 160 and the 5G core of the core network 140 may include various software components that are required to communicate with each other, handle large volumes of data traffic and are able to properly respond to changes in the network. In some embodiments, the network diagnostic tool 160 may be implemented locally to a data center, such as EDC/RDC 130. In some embodiments, the network diagnostic tool 160 may be implemented virtually as software being executed in the cloud with the overlay network infrastructure on top of the cloud underlayment infrastructure. In some embodiments, the network diagnostic tool 160 may be implemented as a virtual machine. In the illustrated embodiment of system 100, the cloud-based cellular network components may include the network diagnostic tool 160. Detection, evaluation, and diagnostics of problems that arise during operation of the system 100 may be performed by the network diagnostic tool 160. The network diagnostic tool 160 may perform various software processes executed by underlying computer hardware. The network diagnostic tool 160 may monitor other components of the system 100, assess alarms, and perform diagnostics with respect to the various components of the system 100.

Figure 2:
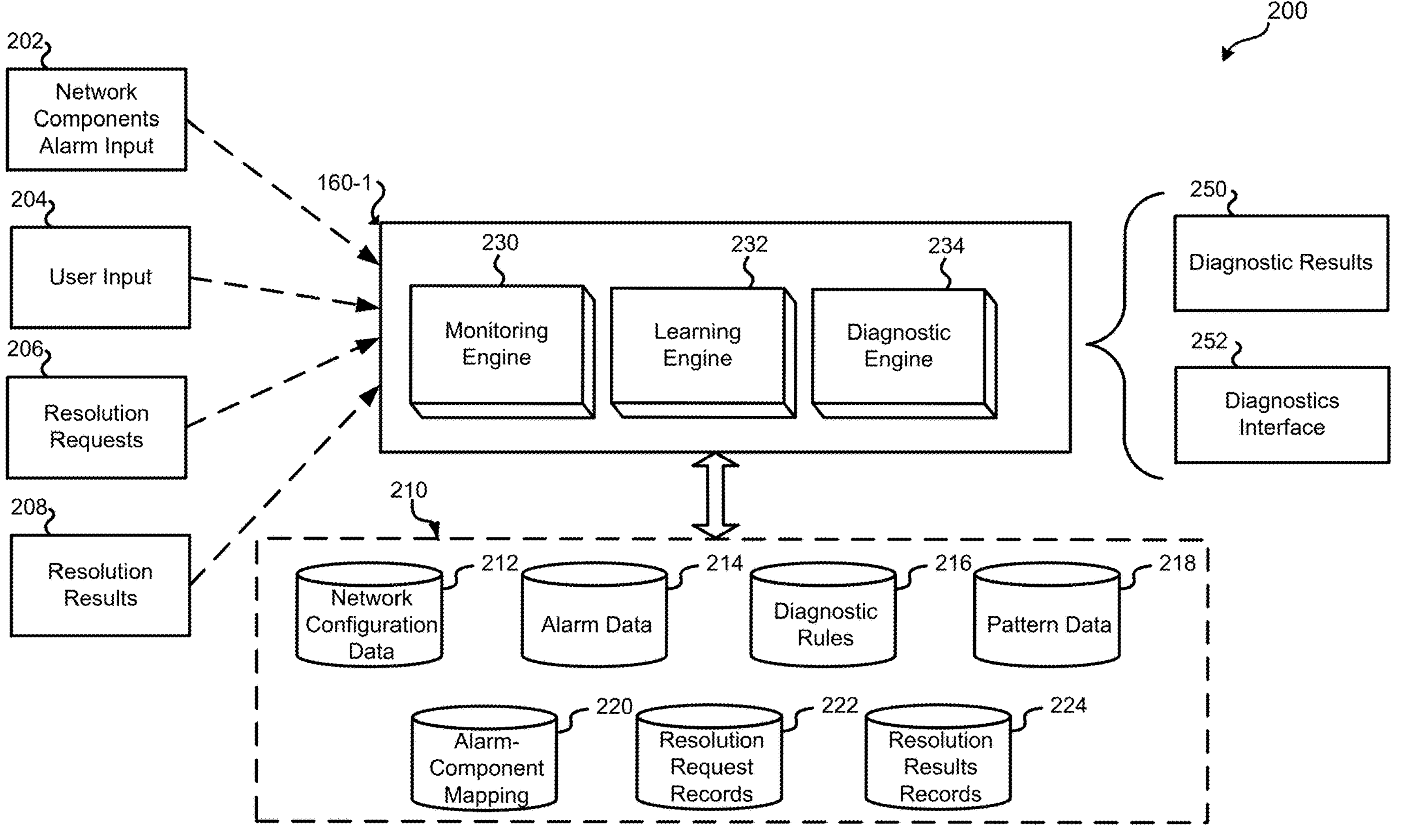
FIG. 2 illustrates cellular network monitoring and alarm subsystem to facilitate cellular network monitoring and diagnostics, in accordance with disclosed embodiments according to the present disclosure.

FIG. 2 illustrates a cellular network monitoring and alarm subsystem 200 to facilitate cellular network monitoring and diagnostics, in accordance with embodiments according to the present disclosure. The subsystem 200 may correspond to aspects of the system 100. While the subsystem 200 is illustrated as being composed of multiple components, it should be understood that the subsystem 200 may be broken into a greater number of components or collapsed into fewer components. Each component may include any one or combination of computerized hardware, software, and/or firmware. The subsystem 200 may include the network diagnostic tool 160-1 and one or more repositories 210, which may be included in or separately from the network diagnostic tool 160-1 and which may be located on the premises of a datacenter or remotely therefrom such as in the cloud. The network diagnostic tool 160-1 may perform operations for cellular network monitoring and diagnostics, according to various embodiments.

Figure 4:
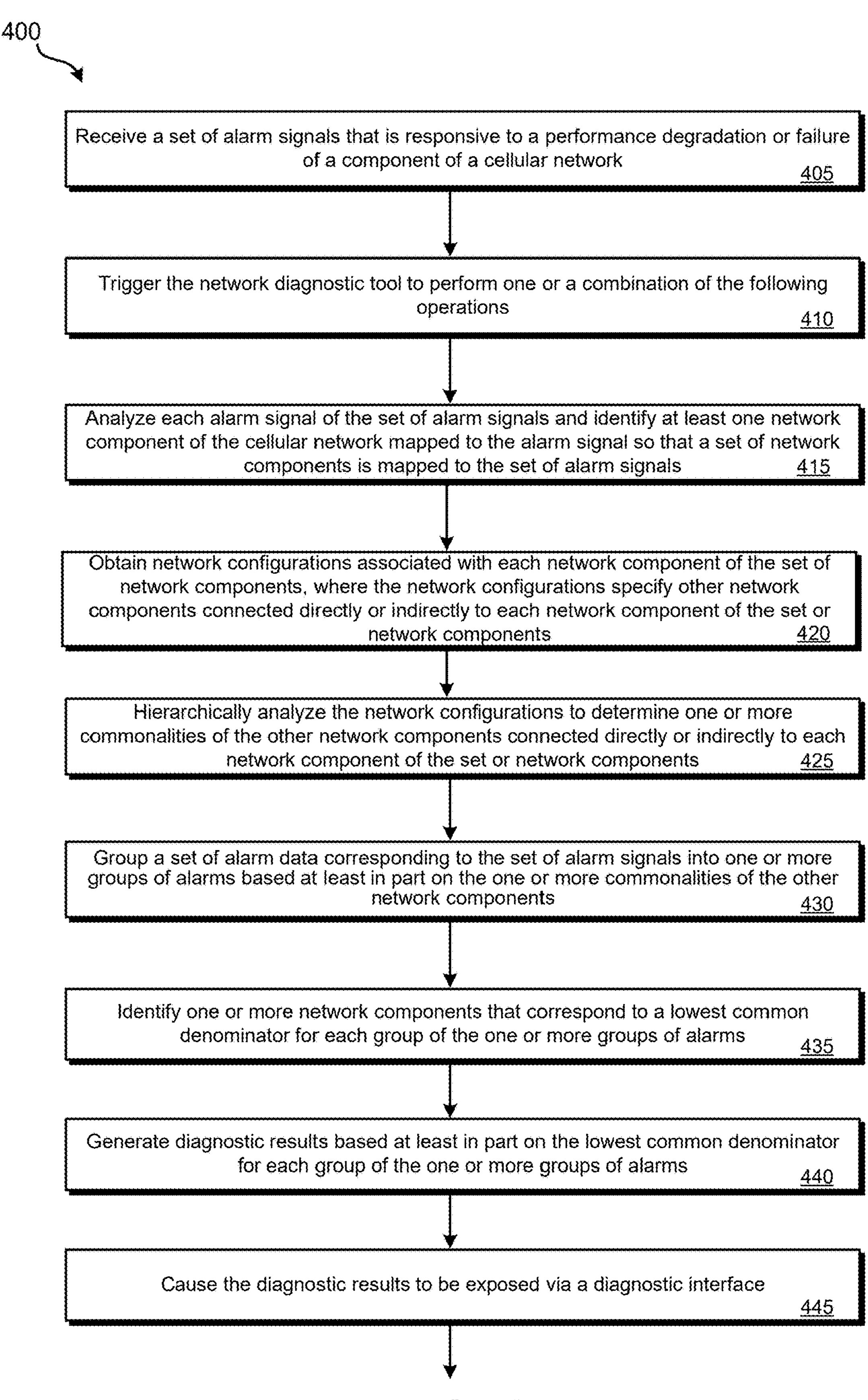
FIG. 4 illustrates a method for cellular network diagnostics, in accordance with disclosed embodiments according to the present disclosure.

For example, FIG. 4 illustrates one example method 400 for cellular network diagnostics, in accordance with certain embodiments of the present disclosure. One or a combination of the aspects of the method 400 may be performed in conjunction with one or more other aspects disclosed herein, and the method 400 is to be interpreted in view of other features disclosed herein and may be combined with one or more of such features in various embodiments. Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein may be separated for the sake of description, it should be understood that certain steps may be performed simultaneously or substantially simultaneously.

As indicated by block 405, a set of alarm signals may be received, where each alarm signal of the set of alarm signals is responsive to a performance degradation or failure of a component of a cellular network. As indicated by block 410, responsive to the set of alarm signals, the network diagnostic tool 160-1 may be triggered to perform one or a combination of the following operations. As indicated by block 415, each alarm signal of the set of alarm signals may be analyzed, and at least one network component of the cellular network mapped to the alarm signal may be identified so that a set of network components is mapped to the set of alarm signals.

As indicated by block 420, network configurations associated with each network component of the set of network components may be obtained. The network configurations may specify other network components connected directly or indirectly to each network component of the set or network components. As indicated by block 425, the network configurations may be hierarchically analyzed to determine one or more commonalities of the other network components connected directly or indirectly to each network component of the set or network components.

As indicated by block 430, a set of alarm data corresponding to the set of alarm signals may be grouped into one or more groups of alarms based at least in part on the one or more commonalities of the other network components. As indicated by block 435, one or more network components that correspond to a lowest common denominator for each group of the one or more groups of alarms may be identified. As indicated by block 440, diagnostic results may be generated based at least in part on the lowest common denominator for each group of the one or more groups of alarms.

As indicated by block 445, the diagnostic results may be caused to be exposed via a diagnostic interface. The diagnostics results may include the one or more groups of alarms grouped based at least in part on the one or more commonalities. Additionally or alternatively, the diagnostics results may include a set of one or more most likely issues causing each group of the one or more groups of alarms based at least in part on the one or more network components that correspond to the lowest common denominator for each group of the one or more groups of alarms and/or one or more tracked resolution requests corresponding to one or more previous alarms and recency of the one or more previous alarms. Additionally or alternatively, the diagnostics results may include a set of one or more most likely issues causing each group of the one or more groups of alarms ranked based at least in part on remedial actions. One or more graphical representations of the one or more groups of alarms, the set of one or more most likely issues may be exposed via the diagnostic interface. Further details regarding the method 400 are disclosed in the following descriptions.

Referring again to FIG. 2, the network diagnostic tool 160-1 may be executed by one or more processors and may be communicatively coupled with interface components and communication channels (which may take various forms in various embodiments as disclosed herein) configured to receive network components alarm input 202 and user input 204. The subsystem 200 and the network diagnostic tool 160-1 may be communicatively coupled to the architecture of the system 100. The subsystem 200 may maintain an inventory of network configuration data 212 that show how the system 100 is put together from a physical perspective and a logical perspective. The network configuration data 212 may include mappings of everything in the system 100—e.g., a mapping of the cell site 105-1 and its connection to the CSR 110-1, which may be connected via a single mode fiber jumper to the NID 115-1, and so on for the entire system 100. Every single link of the system 200 may be mapped out and modeled by the subsystem 200 with specifications for links and terminations (e.g., a particular port is connected to a particular NID 115, etc.). In various embodiments, the repositories 210 may include one or a combination of one or more databases, one or more data systems, one or more inventory systems, and/or the like needed to facilitate the mappings.

The network components alarm input 202 may include all network device alarm signals that may be received for all network components of the system 100. For example, the alarm input 202 may correspond to alarm signals triggered by and indicating one or a combination of: a node being detected as unreachable because of a disruption in a heartbeat/keep-alive signal from the node, and then the node being non-responsive to one or more confirmation pings; packet errors;

various different faults; a door being opened; device temperatures exceeding one or more thresholds; CPU utilization exceeding one or more thresholds; operating parameters exceeding normal operating conditions and one or more thresholds; alarms on an antennae of a cell tower indicating overvoltage or undervoltage conditions; alarms indicating water in a line preventing proper reflection/propagation of RF signals; loss of power alarms; bursty traffic or network storm that is causing CPU utilization to go too high; communication disruptions from an edge router 135 to the core network 140; issues with a failover link between edge routers 135; and/or the like. The alarm input 202 may be caused by sensors and may correspond to any suitable alarm signal for any component of the system 100. Each alarm signal may include a site identifier (e.g., cell site 1, 2, . . . ), a device identifier (e.g., CSR 1, 2, . . . ) and/or a network identifier (e.g., VLAN 4), a port identifier (e.g., port 27-3), and a type of alarm and/or condition.

The subsystem 200 may process the alarm input 202 and analyze the alarm input 202 to provide for cellular network monitoring and diagnostics features, including generating diagnostic results 250 and generating a diagnostics interface 252 to facilitate presentation of the diagnostic results 252. The network diagnostic tool 160-1 may include a monitoring engine 230 configured to monitor the alarm input 202 and user input 204. The monitoring engine 230 may also be configured to monitor for resolution requests 206 and resolution results 208. A resolution request 206 may, for example, be generated after the network diagnostic tool 160-1 generates a set of one or more diagnostic results 250 and causes presentation thereof with the diagnostics interface 252.

Figure 3:
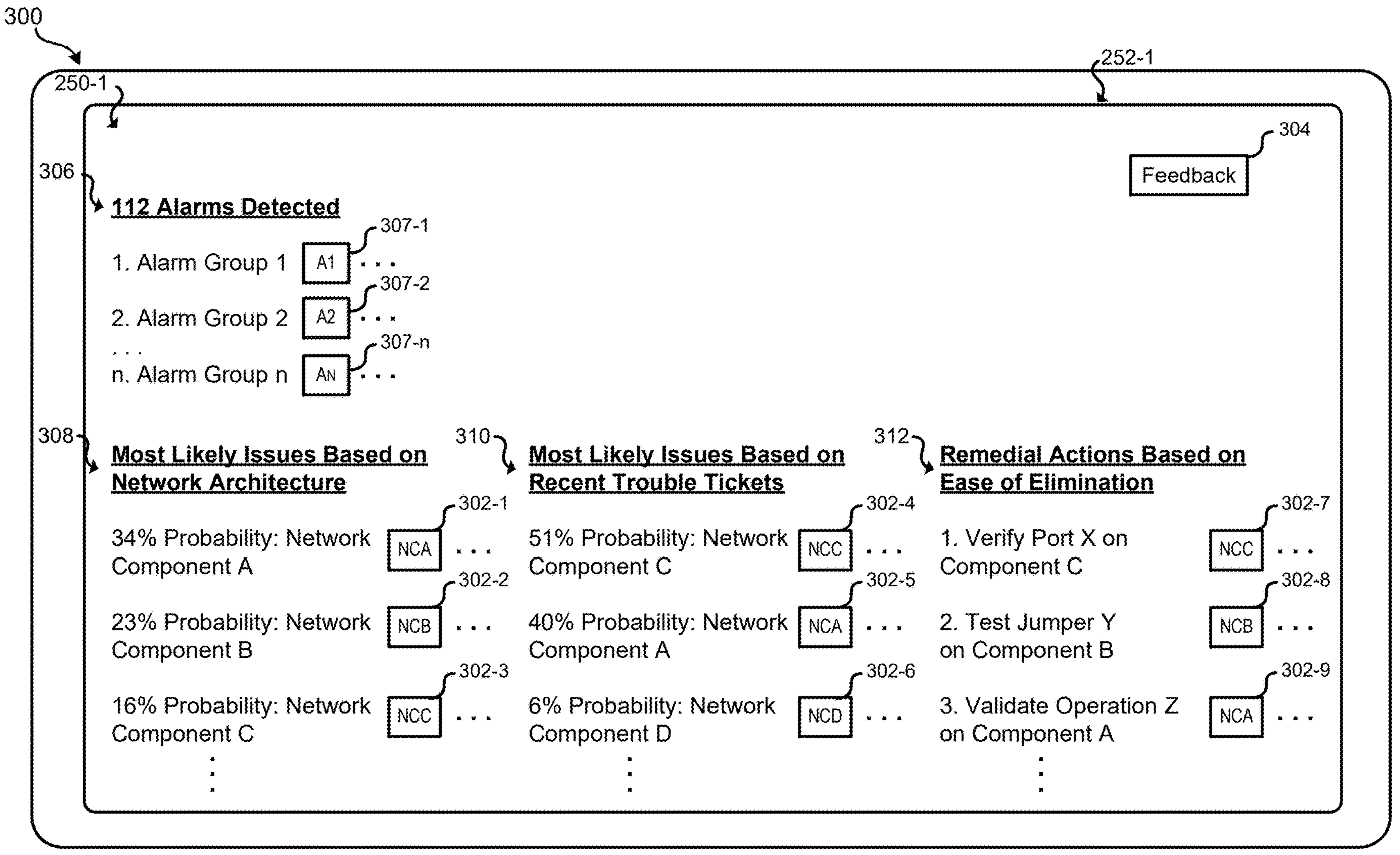
FIG. 3 illustrates some aspects of a diagnostics interface presenting some aspects of diagnostic results, in accordance with disclosed embodiments according to the present disclosure.

FIG. 3 is an illustration 300 of some aspects of a diagnostics interface 252-1 presenting some aspects of diagnostic results 250-1, in accordance with embodiments according to the present disclosure. In various embodiments, the diagnostics interface 252-1 may be provided via any suitable computing device, such as a desktop workstation, a laptop, a tablet, a smartphone, another mobile device, and/or the like, which may be configured with the network diagnostic tool 160 or may be configured to operate a virtual instance of the network diagnostic tool 160 and/or may be communicatively coupled to other components of the system 100 that include and operate the network diagnostic 160. Selected portions of the diagnostic results 250-1 may be presented with a display. While some examples are presented for illustration purposes, other embodiments are possible.

The diagnostics interface 252-1 may include a set of one or more interface elements corresponding to the one or more diagnostic results 250-1 presented. Some of such interface elements (e.g., elements 302 (302-1, 302-2, . . . 302-9)) may be user-selectable and may be configured to allow for a generation of one or more resolution requests 206 (shown in FIG. 2) corresponding to the issues identified by the diagnostic results 250-1. Thus, for example, with the user-selectable interface elements 302 being presented with the diagnostics interface 252, a user may provide user input 204 (indicated in FIG. 2) to select one or more options to generate a resolution request 206 (e.g., to run a self-test on a particular port, send a field crew to replace an antenna, repair a portion of the fiber network, etc.).

Referring again to FIG. 2, in some embodiments, for example, a resolution request 206 may correspond to a trouble ticket generated based at least in part on the diagnostic results 250. As resolution requests 206 are generated, the network diagnostic tool 160-1 may process the resolution requests 206 and store data corresponding to the resolution requests 206 in a resolution request records data storage 222. The resolution requests records 222 may, for example, correspond to past trouble tickets generated based at least in part on the user input 204 and/or the network diagnostic tool 160-1 and associated with the particular items of alarm data 218 and corresponding network alarm-component mapping data 220. The network alarm-component mapping data 220 may, for example, correspond to data regarding past correlations of particular sets of one or more alarms to corresponding sets of one or more network components that the network diagnostic tool 160-1 performed. Thus, as the network diagnostic tool 160-1 correlates one or more alarms to one or more network components, the network diagnostic tool 160-1 may store the corresponding mapping data in the alarm component mapping data store 222.

The resolution results 208 may correspond to indicia of the results of the actions taken pursuant to the resolution request 206 and may be used in one or more ongoing learning/training modes of the network diagnostic tool 160-1 (e.g., to refine diagnostic rules 216 and pattern data 218 over time). The network diagnostic tool 160-1 may track each resolution request 206 made pursuant to the diagnostic results 250 to determine a corresponding resolution result 208. The resolution result 208 may indicate whether or not one or more remedial actions pursuant to the resolution request 206 were completed, a time of completion, and whether or not the one or more remedial actions were successful in providing a solution to the problem identified by the one or more diagnostic results 250.

The resolution results 208 may be based at least in part on user input 204 that may correspond to, for example, closing a trouble ticket and selecting or otherwise indicating remedial actions and their results. In some embodiments, the network diagnostic tool 160-1 may trace the resolution requests 206 to one or more network components specified by the resolution request 206 and monitor the one or more network components to determine if the one or more components become operational at a time corresponding to completion of the resolution requests 206 (e.g., a time window encompassing the time of completion, with a certain period of time before the detected time of completion and a certain period of time after the detected time of completion). The network diagnostic tool 160-1 may infer that a detection of the one or more components becoming operational contemporaneously with the detected time of completion indicates that the remedial action specified by the resolution request 206 was successful. The network diagnostic tool 160-1 may process the resolution results 208 and store corresponding resolution results data in a resolution results records data store 224.

The network diagnostic tool 160-1 may include a learning engine 232 that may be an analysis engine configured to determine any suitable aspects pertaining to aspects of detection, evaluation, and diagnostics of problems that arise during operation of the system 100 based at least in part on the alarm input 202 received and processed by the monitoring engine 230. The learning engine 232 may include logic to implement and/or otherwise facilitate any taxonomy, classification, categorization, correlation, mapping, qualification, scoring, organization, and/or the like features disclosed herein. In various embodiments, the learning engine 232 may be configured to analyze, classify, categorize, characterize, tag, and/or annotate the alarm data 214, the network configuration data 212, the diagnostic rules 216, the alarm-component mapping 220, the resolution requests 222, the resolution records 224, and the pattern data 218 for the system 100.

In some embodiments, the learning engine 232 may employ one or more artificial intelligence (machine learning or, more specifically, deep learning) algorithms to perform pattern matching to detect patterns 218 of the alarm data 214, the network configuration data 212, the diagnostic rules 216, the alarm-component mapping 220, the resolution requests 222, and/or the resolution records 224 for the system 100. The learning engine 232 may generate, develop, and/or otherwise use the network configuration data 212, the alarm data 214, the alarm-component mapping 220, the diagnostic rules 216, and/or the pattern data 218 based at least in part on the network components alarm input 202 and/or the user input 204. The learning engine 232 may, for example, correlate one or more alarm signals, one or more items of network configuration data 212, one or more diagnostic rules 216, and one or more patterns of the pattern data 218. The learning engine 232 may compile any one or combination of the network configuration data 212, the alarm data 214, the diagnostic rules 216, the alarm-component mapping 220, the resolution requests 222, and/or the resolution results 224 to create, for example, based at least in part on machine-learning, pattern data 218 that may include pattern particulars to facilitate detection, recognition, and differentiation of patterns for alarms, corresponding network components, corresponding diagnostic rules 216, corresponding diagnostic results 250, and/or the like.

The learning engine 232 may include a reasoning module to make logical inferences from a set of the detected and differentiated data to infer one or more patterns 218 of alarm data 218, corresponding network alarm-component mapping data 220, corresponding resolution requests 222, corresponding records of resolution 224 (e.g., past records of attempted resolutions, failed resolutions, and successful resolutions that resulted from the past trouble tickets), and/or the like for past instances of detected alarms, stored resolution requests, and stored resolutions. For instance, the pattern data may include information about any one or combination of alarm histories, corresponding network component histories, corresponding resolution request histories, corresponding resolution histories, and/or the like, any set of which may be used to derive one or more of such patterns. A pattern-based reasoner could be employed to use various statistical techniques in analyzing the data in order to make inferences based on the analysis of the different types of alarm identification data, network component identification data, corresponding resolution request data, and corresponding resolution data, both current and historical. A transitive reasoner may be employed to infer relationships from a set of relationships related to different types of alarm identification data, network component identification data, corresponding resolution request data, and corresponding resolution data.

The monitoring engine 230 and/or the learning engine 232 may facilitate one or more ongoing learning/training modes. The monitoring engine 230 and/or the learning engine 232 may employ an ongoing learning mode to confirm, correct, and/or refine determinations made for diagnostic rules 216, pattern data 218, and diagnostic results 250. For example, having come to one or more conclusions about, and generated, diagnostic rules 216, pattern data 218, and diagnostic results 250, the network diagnostic tool 160-1 may confirm and/or correct the determinations with feedback loop features that may be based at least in part on the user input 204 and/or the resolution results 208. In some embodiments, the diagnostics interface 252 may provide user-selectable feedback options to facilitate the ongoing learning mode. User-selectable options (e.g., 304 in FIG. 3) via the diagnostics interface 252 provided with notifications (e.g., push notifications, overlays, windows, frames, etc.) could be provided to allow administrative confirmation or correction of conditions detected. The feedback could be used for training the network diagnostic tool 160-1 to heuristically adapt conclusions, specifications, correlations, attributes, triggers, patterns, and/or the like for diagnostic rules 216, pattern data 218, and diagnostic results 250.

The network diagnostic tool 160-1, using the learning engine 232 and/or a diagnostic engine 234, may correlate alarm input 202 to the network configuration data 212, the alarm-component mapping 220, the diagnostic rules 216, and/or the pattern data 218 to determine and generate diagnostic results 250. By way of example, it may be possible for a network operations center to receive a hundred or more alarms at once. When errors and alarms come in from various components of the system 100, the subsystem 200 may utilize the network diagnostic tool 160-1. Thus, for example, the network diagnostic tool 160-1 may receive a large number of alarms with the alarm input 202 within a short time window. The network diagnostic tool 160-1 may store the alarm data corresponding to the alarm signals in an alarm data repository 214. The network diagnostic tool 160-1, configured with diagnostic rules 216, may use the diagnostic rules 216 to determine if all alarms or which alarms are related and determine if and which alarms are related to different events (e.g., a set of alarms could be related to three different events that occurred approximately at the same time). The network diagnostic tool 160-1, for example, using the learning engine 232 and/or the diagnostic engine 234, may analyze the alarm signals to determine what attributes the alarms may have in common and what devices throughout the system 100 the alarms may have in common. The analyses of the network diagnostic tool 160-1 may include differentiating, correlating, and grouping different alarms to determine if and where one or more commonalities exist as shared between one or more of the alarms.

The correlation results of the grouping of the alarms according to commonalities may be indicated in the network diagnostic interface 252-1, as illustrated in FIG. 3, which indicates a number of alarms 306 detected simultaneously or otherwise contemporaneously within a short time window. The alarm indication 306 may present the alarm groupings. Each alarm group may be presented with one or more user-selectable options 307 (307-1, 307-2, . . . , **307-*n*) configured to allow for selection to reveal further details (e.g., a corresponding site identifier, a device identifier, a network identifier, a port identifier, a type of alarm, a condition, the one or more commonalities of each group, the lowest common denominator network component for each group, and/or the like) regarding each alarm group and the alarms included therein and to allow for generation of one or more resolution requests by the network diagnostic tool 160-1 or communicatively coupled issue tracking system of the system 100**.

Referring again to FIG. 2, the network diagnostic tool 160-1 may include the diagnostic engine 234, which may be configured to determine and generate the diagnostic results 250, as well as generate the diagnostics interface 252. The network diagnostic tool 160-1, using the learning engine 232 and/or the diagnostic engine 234, may identify one or more commonalities shared by one or more alarms. Likewise, the network diagnostic tool 160-1, using the learning engine 232 and/or the diagnostic engine 234, may identify one or more commonalities that do not exist among the alarms. For example, if, say, 490 sites are up and 10 are down, the network diagnostic tool 160-1 may recognize that the issue is not due to an aggregation point for all 500 sites, such as a router connecting all of them because the router is either operational or not. However, the network diagnostic tool 160-1 may recognize that the issue could be due to a set of one or more ports on the routers, as opposed to the entire router.

The analyses may involve the network diagnostic tool 160-1 examining network configuration data 212 for mappings and specifications of the components of the architecture of this system 100 indicated by the alarms and related to such components to identify any commonalities of links, of devices, of circuits, etc. Having identified one or more commonalities, the network diagnostic tool 160-1, using the learning engine 232 and/or the diagnostic engine 234, may determine the lowest point of commonality for each set of alarms using the diagnostic rules 216. According to the diagnostic rules 216, this may involve identifying immediate sources of alarms, such as those indicated in each alarm signal, then analyzing the network components that are hierarchically related to the sources in the architecture of the system 100. The hierarchical examination specified by the diagnostic rules 216 may include examining similar sites at a particular level in the hierarchy to determine whether or not all components at that level are experiencing problems indicated by the alarms or other corresponding problems. The hierarchical examination may then include examining one or more lower levels within the hierarchy for components that may also be experiencing problems indicated by, or otherwise corresponding to, the alarms.

The diagnostic rules 216 may specify checking various components of the system 100 that are similar to the alarm-triggering components (e.g., connected to the alarm-triggering components, at the same level in the hierarchy as the alarm-triggering components, hierarchically related to the alarm-triggering components, or otherwise related to the alarm-triggering components) that may be up and running. For example, the network diagnostic tool 160-1 may check the similar components to determine whether they are up and running just because they had a failover due to redundancy measures. This may involve analyzing the alarm input 202 to determine whether alarms were triggered for the similar components and, in some embodiments, polling the components for data or other indicia of a failover. Accordingly, the network diagnostic tool 160-1 may also include detection of failover instances in its analyses.

Thus, based at least in part on the lowest point of commonality for a group of alarms, the network diagnostic tool 160-1, using the learning engine 232 and/or the diagnostic engine 234, may identify the lowest common denominator likely causing a problem that triggers the group of alarms. For example, according to the diagnostic rules 216, if, say, 500 sites go down, then the network diagnostic tool 160-1 may recognize that the problem may be due to an NNI with a carrier A, B, or C. If only one NNI is lost, then the diagnostic rules 216 may point to a port of the NNI that may not be operational. However, if, say, 1500 sites go down, then the network diagnostic tool 160-1 may recognize it is not just due to an NNI, as there may be three NNIs down across three different carriers, and the network diagnostic tool 160-1 may flag the edge router in the EDC as potentially being the problem because it is the lowest common denominator that would cause that level of impact. As another example, the diagnostic rules 216 may factor in that there can be one to ten or more fiber providers and networks in a given market, where each carrier may provide a particular fiber network. If ten sites are down out in field, then the lowest common denominator may correspond to all the sites being linked to a particular fiber network and all on one NNI in the same geographical area.

The network diagnostic tool 160-1 may not only perform diagnostics with respect to transport components (e.g., fiberoptics, transports, data centers, etc.), but also may perform diagnostics with respect to radio network components. The network diagnostic tool 160-1 may be configured to examine the architecture of the cell site, examine LCDs, among other components, and determine most likely set of one or more causes of the one or more issues. For example, the network diagnostic tool 160-1 may analyze signals indicating a radio being down on a tower and determine whether there is a high probability of water in a line preventing proper reflection/propagation of RF signals or of different equipment failures whether it be a distributed unit (DU) or a centralized unit (CU). If there is one antenna with six ports connected to six ports on an RF transmitting radio and one or more alarms are correlated to one line, then the network diagnostic tool 160-1 may determine that there is a high probability that the jumper between the radio and the antenna is the problem. However, if one or more alarms are correlated to all six ports, then the network diagnostic tool 160-1 may determine that there is a high probability that the whole antenna is the problem.

Accordingly, the diagnostic rules 216 may include criteria for identifying issues corresponding to the alarm input 202. The learning engine 232 and/or the diagnostic engine 234 may also use the diagnostic rules 216 to qualify the identified potential issues according to a graduated diagnostic scale. Any suitable diagnostic scale may be used in various embodiments. In some embodiments, a diagnostic scale could entail a categorization scheme, with categories such as strong identification, possible identification, and weak identification as the potential cause of a set of one or more alarms.

In some embodiments, a diagnostic scale may entail a diagnostic scoring system. The diagnostic scoring system may score an identified potential issue with a numerical expression, for example, an identification score. For example, in some embodiments, an identification score may be an assessment of a probably that the identified potential issue is the actual cause of a set of one or more alarms, taking into account a number of factors, each of which may be weighted differently. By way of example, a diagnostic scale may include a range of identification scores from 0 to 100, or from 0 to 1,000, with the high end of the scale indicating greater probability. Some embodiments may use methods of statistical analysis to derive an identification score. Various embodiments may determine an identification score based on any one or more suitable quantifiers. An identification score may be based at least in part on the extent to which detected characteristics of the captured data match previously determined characteristics stored in the specifications. In some embodiments, an identification score may be cumulative of scores based on matching each type of the characteristics. With an identification score determined, categorizations may be made based on the score. By way of example without limitation, a score correlated to a 75-100% band may be deemed a positive identification of a cause; a score correlated to a 70-75% band may be deemed a possible identification; a score correlated to a 25-50% band may be deemed a weak identification; and a score below a 25% minimum threshold may be deemed a weak/insufficient identification.

The network diagnostic tool 160-1 (e.g., using the diagnostic engine 234) may rank identified potential causes according to the scoring of each. Referring to FIG. 3, based in part on such analyses and scoring, the network diagnostic tool 160-1 may cause presentation of the most likely issues based on the network architecture 308 via the network diagnostic interface 252-1. The potential causes may be presented in a ranked order according to the probability that the network diagnostic tool 160-1 determined for each potential cause.

Referring again to FIG. 3, in some embodiments, the network diagnostic tool 160-1 may correlate the identified potential causes to previous resolution requests 222 and corresponding resolution results 224 collected over time. The network diagnostic tool 160-1 may, for example, identify the three most likely issues from a network architecture perspective (e.g., 308 in FIG. 3) but may be able to identify the most common fault based at least in part on the resolution requests 222 and resolution results 224 in the last six months. Thus, the ranked potential causes may be filtered according to observed resolution requests 222 and corresponding resolution results 224. The most likely issues based on recent resolution requests/results may be indicated via the diagnostic interface 252 (e.g., 310 in FIG. 3). In some embodiments, relationships of potential causes to observed resolution requests 222 and corresponding resolution results 224 may be a factor in the scoring of the potential causes.

In some embodiments, the observed resolution requests 222 and corresponding resolution results 224 may be tagged with recency attributes that correspond to time parameters respectively indicating when the requests 222 were instantiated and when the resolution results 224 were finalized. The recency attributes may be used in selecting resolution requests 222 and resolution results 224 according to a rolling time window. Accordingly, identification of potential causes may be a function of recency of observed resolution requests 222 and resolution results 224.

Additionally, the network diagnostic tool 160-1 may correlate the identified potential causes to remedial actions based on ease of elimination, that is, based on one or a combination of speed, simplicity, and/or effort necessary to perform a test, validation, or another remedial action in order to verify or eliminate a potential cause from consideration. Specifications of remedial actions may, for example, be stored in the diagnostic rules repository 216. The specifications of remedial actions may be tagged with ease of elimination attributes that correspond to a score of each remedial action based on ease of elimination.

In some embodiments, the scoring of remedial actions may be a function of one or a combination of user input 204 indicating ease of elimination, feedback (e.g., user-supplied feedback consequent to selection of one or more feedback options 304) indicating ease of elimination, and/or analyses of resolution requests 222 and corresponding resolution results 224 by the network diagnostic tool 160-1. For example, the learning engine 232 may examine resolution request 222 and corresponding resolution results 224 to determine differences of time between initiation of the resolution requests 222 and completion of the corresponding resolution results 224. Based at least in part on the temporal differences, the learning engine 232 may identify which types of past remedial actions took less time to perform (e.g., had relatively short time spans between request initiation and resolution completion) relative to other remedial actions. The learning engine 232 may rank the remedial actions accordingly. In some embodiments, the rankings may be indicated in the ease of elimination attributes. The diagnostic engine 232 may use the ease of elimination attributes of remedial actions mapped to the identified potential causes (e.g., 308 and/or 310 in FIG. 3) to rank the potential causes according to ease of elimination. The remedial actions based on ease of elimination 312 may be presented via the diagnostic interface 252-1, as indicated, for example, in FIG. 3.

Figure 5:
FIG. 5 illustrates one embodiment of a computer system that may perform various steps of the methods provided by various embodiments.
Figure 5:
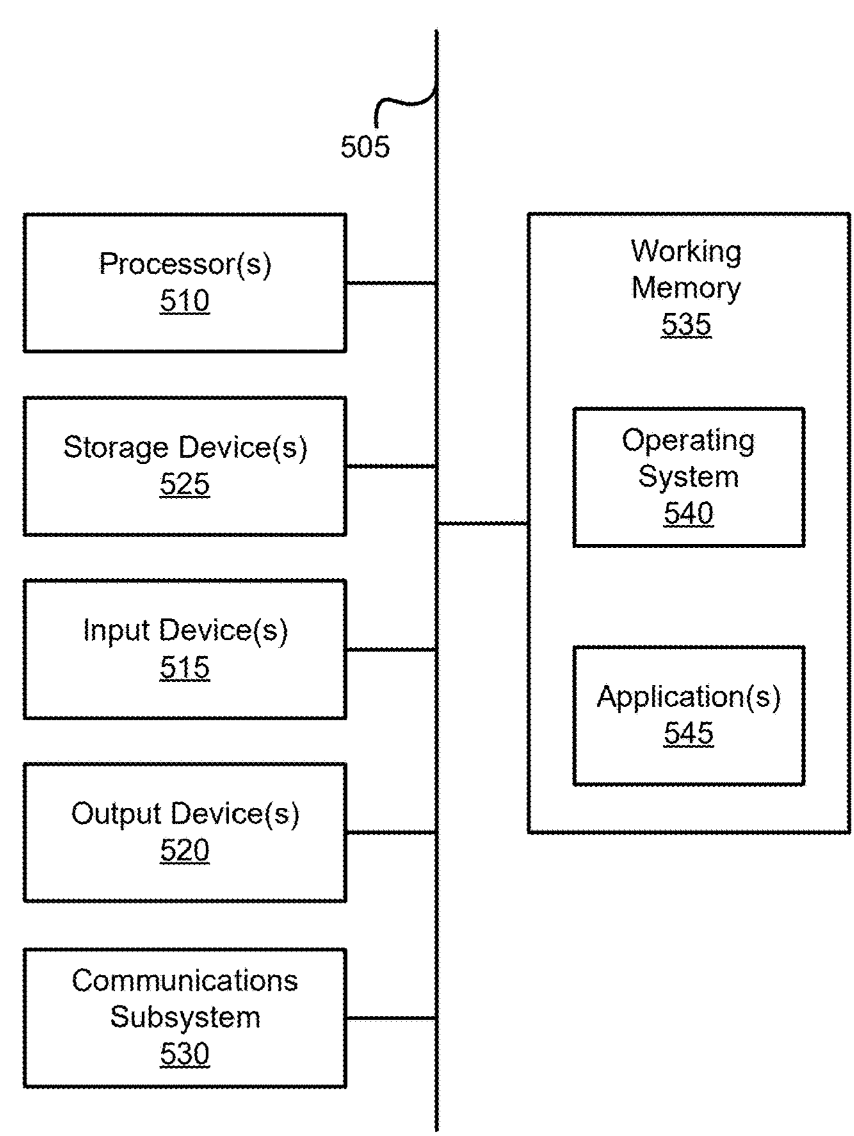

A computer system as illustrated in FIG. 5 may be incorporated as part of the computerized devices that may be used for the network diagnostic tool 160 and other computer components disclosed above. FIG. 5 provides a schematic illustration of one embodiment of a computer system 500 that can perform various steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner. The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, video decoders, and/or the like); one or more input devices 515, which can include without limitation a mouse, a keyboard, remote control, and/or the like; and one or more output devices 520, which can include without limitation a display device, a printer, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data storages, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium," "machine-readable media," "computer-readable storage medium," "computer-readable storage media," "computer-readable medium," "computer-readable media," "processor-readable medium," "processor-readable media," and/or like terms as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method for cellular network diagnostics, the method comprising:

receiving a set of alarm signals, where each alarm signal of the set of alarm signals is responsive to a performance degradation or failure of a component of a cellular network;

triggering a network diagnostic tool to perform operations comprising:

analyzing each alarm signal of the set of alarm signals and identifying at least one network component of the cellular network mapped to the alarm signal so that a set of network components is mapped to the set of alarm signals;

obtaining network configurations associated with each network component of the set of network components, where the network configurations specify other network components connected directly or indirectly to each network component of the set or network components;

hierarchically analyzing the network configurations to determine one or more commonalities of the other network components connected directly or indirectly to each network component of the set or network components;

grouping a set of alarm data corresponding to the set of alarm signals into one or more groups of alarms based at least in part on the one or more commonalities of the other network components;

identifying one or more network components that correspond to a lowest common denominator for each group of the one or more groups of alarms;

determining a set of one or more issues having a highest probability of causing each group of the one or more groups of alarms based at least in part on the one or more network components that correspond to the lowest common denominator for each group of the one or more groups of alarms;

generating diagnostic results comprising the set of one or more issues having the highest probability of causing each group of the one or more groups of alarms; and causing the diagnostic results, including one or more graphical representations of the set of one or more issues, to be exposed via a diagnostic interface.

2. The method for cellular network diagnostics as recited in claim 1, wherein the diagnostics results comprise the one or more groups of alarms grouped based at least in part on the one or more commonalities, and one or more graphical representations of the one or more groups of alarms are exposed via the diagnostic interface.

3. The method for cellular network diagnostics as recited in claim 1, the operations further comprising:

determining a second set of one or more issues having a highest probability of causing each group of the one or more groups of alarms based at least in part on one or more resolution requests corresponding to one or more previous alarms;

wherein the diagnostics results comprise the second set of one or more issues, and one or more graphical representations of the second set of one or more issues are exposed via the diagnostic interface.

4. The method for cellular network diagnostics as recited in claim 3, wherein the determining the second set of one or more issues having the highest probability of causing each group of the one or more groups of alarms is a function of recency of the one or more previous alarms.

5. The method for cellular network diagnostics as recited in claim 3, the operations further comprising:

tracking resolution requests, wherein the one or more resolution requests corresponding to the one or more previous alarms are based at least in part on the tracked resolution requests.

6. The method for cellular network diagnostics as recited in claim 1, the operations further comprising:

ranking set of one or more issues having the highest probability of causing each group of the one or more groups of alarms based at least in part on remedial actions;

wherein the diagnostics results comprise the remedial actions, and one or more graphical representations of the remedial actions ordered according to the ranking are exposed via the diagnostic interface.

7. A system to facilitate cellular network diagnostics, the system comprising:

one or more processing devices; and memory communicatively coupled with, and readable by, the one or more processing devices and having stored therein processor-readable instructions which, when executed by the one or more processing devices, cause the one or more processing devices to perform operations comprising:

receiving a set of alarm signals, where each alarm signal of the set of alarm signals is responsive to a performance degradation or failure of a component of a cellular network;

analyzing each alarm signal of the set of alarm signals and identifying at least one network component of the cellular network mapped to the alarm signal so that a set of network components is mapped to the set of alarm signals;

obtaining network configurations associated with each network component of the set of network components, where the network configurations specify other network components connected directly or indirectly to each network component of the set or network components;

hierarchically analyzing the network configurations to determine one or more commonalities of the other network components connected directly or indirectly to each network component of the set or network components;

grouping a set of alarm data corresponding to the set of alarm signals into one or more groups of alarms based at least in part on the one or more commonalities of the other network components;

identifying one or more network components that correspond to a lowest common denominator for each group of the one or more groups of alarms;

determining a set of one or more issues having a highest probability of causing each group of the one or more groups of alarms based at least in part on the one or more network components that correspond to the lowest common denominator for each group of the one or more groups of alarms;

generating diagnostic results comprising the set of one or more issues having the highest probability of causing each group of the one or more groups of alarms; and causing the diagnostic results, including one or more graphical representations of the set of one or more issues, to be exposed via a diagnostic interface.

8. The system to facilitate cellular network diagnostics as recited in claim 7, wherein the diagnostics results comprise the one or more groups of alarms grouped based at least in part on the one or more commonalities, and one or more graphical representations of the one or more groups of alarms are exposed via the diagnostic interface.

9. The system to facilitate cellular network diagnostics as recited in claim 8, the operations further comprising:

determining a second set of one or more issues having the highest probability of causing each group of the one or more groups of alarms based at least in part on one or more resolution requests corresponding to one or more previous alarms;

wherein the diagnostics results comprise the second set of one or more issues, and one or more graphical representations of the second set of one or more issues are exposed via the diagnostic interface.

10. The system to facilitate cellular network diagnostics as recited in claim 9, wherein the determining the second set of one or more issues having the highest probability of causing each group of the one or more groups of alarms is a function of recency of the one or more previous alarms.

11. The system to facilitate cellular network diagnostics as recited in claim 9, the operations further comprising:

tracking resolution requests, wherein the one or more resolution requests corresponding to the one or more previous alarms are based at least in part on the tracked resolution requests.

12. The system to facilitate cellular network diagnostics as recited in claim 7, the operations further comprising:

ranking a set of one or more most likely issues causing each group of the one or more groups of alarms based at least in part on remedial actions;

wherein the diagnostics results comprise the remedial actions, and one or more graphical representations of the remedial actions ordered according to the ranking are exposed via the diagnostic interface.

13. One or more non-transitory, machine-readable media having machine-readable instructions thereon which, when executed by one or more processing devices, cause the one or more processing devices to perform operations comprising:

receiving a set of alarm signals, where each alarm signal of the set of alarm signals is responsive to a performance degradation or failure of a component of a cellular network;

analyzing each alarm signal of the set of alarm signals and identifying at least one network component of the cellular network mapped to the alarm signal so that a set of network components is mapped to the set of alarm signals;

obtaining network configurations associated with each network component of the set of network components, where the network configurations specify other network components connected directly or indirectly to each network component of the set or network components;

hierarchically analyzing the network configurations to determine one or more commonalities of the other network components connected directly or indirectly to each network component of the set or network components;

grouping a set of alarm data corresponding to the set of alarm signals into one or more groups of alarms based at least in part on the one or more commonalities of the other network components;

identifying one or more network components that correspond to a lowest common denominator for each group of the one or more groups of alarms;

determining a set of one or more issues having a highest probability of causing each group of the one or more groups of alarms based at least in part on the one or more network components that correspond to the lowest common denominator for each group of the one or more groups of alarms;

generating diagnostic results comprising the set of one or more issues having the highest probability of causing each group of the one or more groups of alarms; and causing the diagnostic results, including one or more graphical representations of the set of one or more issues, to be exposed via a diagnostic interface.

14. The one or more non-transitory, machine-readable media as recited in claim 13, wherein the diagnostics results comprise the one or more groups of alarms grouped based at least in part on the one or more commonalities, and one or more graphical representations of the one or more groups of alarms are exposed via the diagnostic interface.

15. The one or more non-transitory, machine-readable media as recited in claim 13, the operations further comprising:

determining a second set of one or more issues having the highest probability of causing each group of the one or more groups of alarms based at least in part on one or more resolution requests corresponding to one or more previous alarms;

wherein the diagnostics results comprise the second set of one or more issues, and one or more graphical representations of the second set of one or more issues are exposed via the diagnostic interface.

16. The one or more non-transitory, machine-readable media as recited in claim 15, wherein the determining the second set of one or more issues having the highest probability of causing each group of the one or more groups of alarms is a function of recency of the one or more previous alarms.

17. The one or more non-transitory, machine-readable media as recited in claim 15, the operations further comprising:

tracking resolution requests, wherein the one or more resolution requests corresponding to the one or more previous alarms are based at least in part on the tracked resolution requests.

18. A method for cellular network diagnostics, the method comprising:

receiving a set of alarm signals, where each alarm signal of the set of alarm signals is responsive to a performance degradation or failure of a component of a cellular network; and triggering a network diagnostic tool to perform operations comprising:

analyzing each alarm signal of the set of alarm signals and identifying at least one network component of the cellular network mapped to the alarm signal so that a set of network components is mapped to the set of alarm signals;

obtaining network configurations associated with each network component of the set of network components, where the network configurations specify other network components connected directly or indirectly to each network component of the set or network components;

hierarchically analyzing the network configurations to determine one or more commonalities of the other network components connected directly or indirectly to each network component of the set or network components;

grouping a set of alarm data corresponding to the set of alarm signals into one or more groups of alarms based at least in part on the one or more commonalities of the other network components;

identifying one or more network components that correspond to a lowest common denominator for each group of the one or more groups of alarms;

determining a set of one or more issues having a highest probability of causing each group of the one or more groups of alarms based at least in part on one or more resolution requests corresponding to one or more previous alarms;

generating diagnostic results based at least in part on the lowest common denominator for each group of the one or more groups of alarms, the diagnostic results comprising the set of one or more issues; and causing the diagnostic results, including one or more graphical representations of the set of one or more issues, to be exposed via a diagnostic interface.

19. A system to facilitate cellular network diagnostics, the system comprising:

one or more processing devices; and memory communicatively coupled with, and readable by, the one or more processing devices and having stored therein processor-readable instructions which, when executed by the one or more processing devices, cause the one or more processing devices to perform operations comprising:

receiving a set of alarm signals, where each alarm signal of the set of alarm signals is responsive to a performance degradation or failure of a component of a cellular network; and analyzing each alarm signal of the set of alarm signals and identifying at least one network component of the cellular network mapped to the alarm signal so that a set of network components is mapped to the set of alarm signals;

obtaining network configurations associated with each network component of the set of network components, where the network configurations specify other network components connected directly or indirectly to each network component of the set or network components;

hierarchically analyzing the network configurations to determine one or more commonalities of the other network components connected directly or indirectly to each network component of the set or network components;

grouping a set of alarm data corresponding to the set of alarm signals into one or more groups of alarms based at least in part on the one or more commonalities of the other network components;

identifying one or more network components that correspond to a lowest common denominator for each group of the one or more groups of alarms;

determining a set of one or more issues having a highest probability of causing each group of the one or more groups of alarms based at least in part on one or more resolution requests corresponding to one or more previous alarms;

generating diagnostic results based at least in part on the lowest common denominator for each group of the one or more groups of alarms, the diagnostic results comprising the set of one or more issues; and causing the diagnostic results, including one or more graphical representations of the set of one or more issues, to be exposed via a diagnostic interface.

20. A method for cellular network diagnostics, the method comprising:

receiving a set of alarm signals, where each alarm signal of the set of alarm signals is responsive to a performance degradation or failure of a component of a cellular network;

triggering a network diagnostic tool to perform operations comprising:

analyzing each alarm signal of the set of alarm signals and identifying at least one network component of the cellular network mapped to the alarm signal so that a set of network components is mapped to the set of alarm signals;

obtaining network configurations associated with each network component of the set of network components, where the network configurations specify other network components connected directly or indirectly to each network component of the set or network components;

hierarchically analyzing the network configurations to determine one or more commonalities of the other network components connected directly or indirectly to each network component of the set or network components;

grouping a set of alarm data corresponding to the set of alarm signals into one or more groups of alarms based at least in part on the one or more commonalities of the other network components;

identifying one or more network components that correspond to a lowest common denominator for each group of the one or more groups of alarms;

ranking a set of one or more issues having a highest probability of causing each group of the one or more groups of alarms based at least in part on remedial actions;

generating diagnostic results based at least in part on the lowest common denominator for each group of the one or more groups of alarms, the diagnostic results comprising the remedial actions; and causing the diagnostic results, including one or more graphical representations of the remedial actions ordered according to the ranking, to be exposed via a diagnostic interface.

21. A system to facilitate cellular network diagnostics, the system comprising:

one or more processing devices; and memory communicatively coupled with, and readable by, the one or more processing devices and having stored therein processor-readable instructions which, when executed by the one or more processing devices, cause the one or more processing devices to perform operations comprising:

receiving a set of alarm signals, where each alarm signal of the set of alarm signals is responsive to a performance degradation or failure of a component of a cellular network;

analyzing each alarm signal of the set of alarm signals and identifying at least one network component of the cellular network mapped to the alarm signal so that a set of network components is mapped to the set of alarm signals;

obtaining network configurations associated with each network component of the set of network components, where the network configurations specify other network components connected directly or indirectly to each network component of the set or network components;

hierarchically analyzing the network configurations to determine one or more commonalities of the other network components connected directly or indirectly to each network component of the set or network components;

grouping a set of alarm data corresponding to the set of alarm signals into one or more groups of alarms based at least in part on the one or more commonalities of the other network components;

identifying one or more network components that correspond to a lowest common denominator for each group of the one or more groups of alarms;

ranking a set of one or more issues having a highest probability of causing each group of the one or more groups of alarms based at least in part on remedial actions;

generating diagnostic results based at least in part on the lowest common denominator for each group of the one or more groups of alarms, the diagnostic results comprising the remedial actions; and causing the diagnostic results, including one or more graphical representations of the remedial actions ordered according to the ranking, to be exposed via a diagnostic interface.

* * * * *